United States Patent [19]
Stenzenberger et al.

[11] 3,879,114
[45] Apr. 22, 1975

[54] SOUND FILM CAMERA WITH DAMPING CIRCUIT

[75] Inventors: Volkmar Stenzenberger, Unterhaching; Eduard Wagensonner, Aschheim, both of Germany

[73] Assignee: Agfa-Gevaert Aktiengesellschaft, Leverkusen, Germany

[22] Filed: June 27, 1974

[21] Appl. No.: 483,671

[30] Foreign Application Priority Data
June 28, 1973 Germany............................ 2333011

[52] U.S. Cl. .................... 352/29; 352/5; 352/25; 352/26; 352/27; 352/91 C
[51] Int. Cl. .......................................... G03b 31/02
[58] Field of Search ............... 352/5, 25, 26, 29, 30, 352/91 C, 91 S; 360/62, 68

[56] References Cited
UNITED STATES PATENTS
3,649,109   3/1972   Isono et al. ...................... 352/91 S Primary Examiner—Joseph F. Peters, Jr.
Assistant Examiner—Russell E. Adams, Jr.
Attorney, Agent, or Firm—Michael S. Striker

[57] ABSTRACT

The camera has a circuit including an amplifier for amplifying audio signals prior to recording same with a recording head on the sound track of the film. Since the motor transporting the film needs a predetermined time to come up to speed, a damping circuit including a field-effect transistor and an RC timing circuit is provided at the input of the amplifier to reduce the signal at the input when the camera is first put into operation and then slowly to increase this signal until it is at full strength when the motor is up to speed.

7 Claims, 1 Drawing Figure

PATENTED APR 22 1975  3,879,114
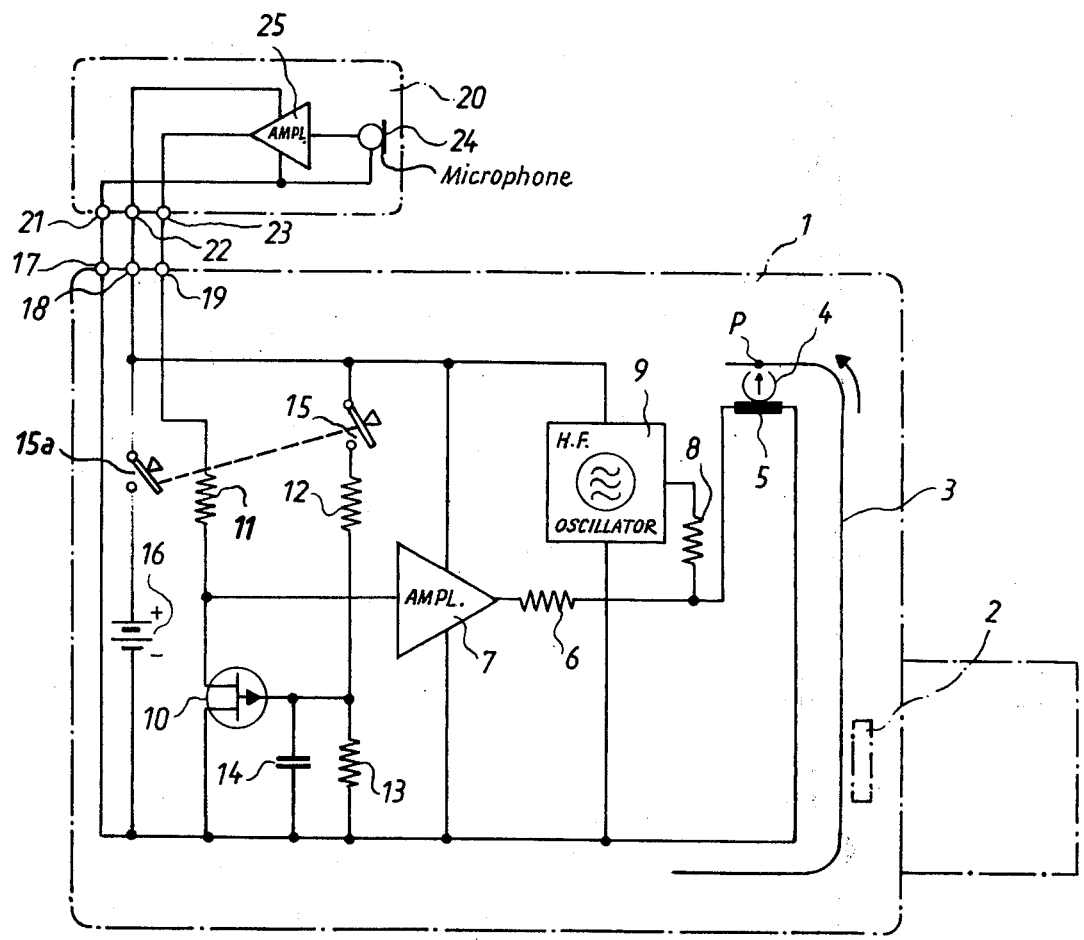

SOUND FILM CAMERA WITH DAMPING CIRCUIT

BACKGROUND OF THE INVENTION

This invention relates to motion picture cameras having film which includes a sound track. It further relates to such cameras which have transfer means which transfer audio signals applied to the camera as, for example, from a microphone a similar sound transducer, on to the sound track of the film.

SUMMARY OF THE INVENTION

It is an object of the present invention to furnish a motion picture camera of the above-described type in which sound recording particularly at the beginning of a scene is free of disturbances and distortions.

The present invention resides in a motion picture camera having film, a sound track on said film, transport means for transporting said film along a predetermined path, said transport means requiring a determined start-up time for reaching a determined operating speed from a stopped condition, and transfer means for transferring audio signals applied to said motion camera to said sound track. It comprises a damping circuit connected to said transfer means for damping the signals to be recorded on said sound track during said determined start-up time. It should be noted that the start-up time in these cameras is relatively large since electromotors energized by a battery are used to transport the film and since the loading on these motors is relatively high relative to their power output. During this start-up time the sounds being recorded would undergo distortion and be subject to noise. The present invention serves to remove these distortions since sound recording is not started at full strength until the motor has reached its desired speed.

In accordance with a preferred embodiment of the present invention the damping circuit comprises a timing circuit which furnishes a timing signal which varies as a function of time and a semiconductor element whose output circuit has a resistance which varies as a function of the signal at its control electrode. The timing circuit of course furnishes the signal at the control electrode. This type of damping circuit yields the advantage that the sound recording is not begun suddenly, but is started with a "fade-in" effect, that is it increases slowly. This is particularly advantageous during scene changes.

In a further preferred embodiment of the present invention, the semiconductor element is a field-effect transistor whose control electrode is connected to the timing circuit which comprises a capacitor and a resistor. The capacitor and resistor are connectable to a battery by means of a switch which is operated in conjunction with the switch initiating the camera operation.

In a further preferred embodiment of the present invention, the transfer means which transfer the audio signals to the sound track of the film comprise an amplifier, and a recording head. The output of the amplifier is connected to a high-frequency oscillator and the so-connected amplifier-high-frequency oscillator are connected to the recording head.

In the camera the recording head is positioned a predetermined distance from the aperture. The time constant of the RC timing circuit is then so chosen that the damping time corresponds to the time that is required for a point on the film to travel to the recording head from the aperture. This type of arrangement yields the advantage that for example after cutting of the film at places where a change in scene takes place, the audio recording corresponding to the film strip being removed is all on the film strip being removed and is not associated with the remaining film.

In a preferred embodiment of the present invention the audio signals are furnished to the camera by microphone means which include a microphone and an amplifier connected to the microphone output. Connected to the output of the amplifier, and in series with the field-effect transistor, is a resistor whose resistance is substantially higher than that of the field-effect transistor when the latter is in the conductive state.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a schematic diagram showing the damping circuit of the present invention as interconnected into the audio circuit of the camera.

DESCRIPTION OF THE PREFERRED EMBODIMENTS

A preferred embodiment of the present invention will now be described with reference to the drawing.

In the single FIGURE, reference numeral 1 refers to a housing of a motion picture camera. The aperture is designated by reference numeral 2, the film by reference numeral 3 and a magnetic recording head by reference numeral 4. The coil 5 of magnetic head 4 is connected through a resistor 6 to the output of an amplifier 7. Further, coil 5 is also connected through a resistor 8 with the output of a high-frequency oscillator 9. The input of amplifier 7 is connected to one of the main electrodes of a field-effect transistor 10. A high resistance resistor 11 is also connected to this electrode. The second main electrode of field-effect transistor 10 is connected to the negative side of the battery 16.

The control electrode of field-effect transistor 10 is connected to the common point of two series connected resistors 12, 13. A capacitor 14 is connected in parallel with resistor 13. Further, one terminal of resistor 13 is connected to the negative side of battery 16, while the terminal of resistor 12 not connected to resistor 13 can be connected to the positive side of battery 16 by the closing of a switch 15. Switch 15 is operated in conjunction with a further switch 15a which is connected in series with battery 16 and causes high-frequency oscillator 9 and amplifier 7 to be energized. Switch 15 could be eliminated if the capability to exclude the damping circuit when desired were not required.

When switches 15, 15a are open, field-effect transistor 10 is blocked. Closing of the switches causes field-effect transistor 10 to be saturated and then slowly to be blocked again after a time period determined by the values of resistors 12 and 13 as well as the value of capacitor 14. These values are so selected that the field-effect transistor is blocked after a time period which corresponds to the time which a point P on the film requires to travel the distance between aperture 2 and magnetic head 4.

Reference numerals 17, 18 and 19 refer to terminals on the camera which are connectable to the microphone means 20. Microphone means 20 comprise the actual microphone 24 and an amplifier 25 connected to the output of microphone 24. The output of amplifier 25 is furnished at a terminal 23 which is directly connected to terminal 19 on the camera. The above-mentioned resistor 11 is connected from terminal 19 to that main electrode of field-effect transistor 10 which is connected to the input of amplifier 7. Further, positive voltage is applied to amplifier 25 from terminal 22 which is directly connectable to terminal 18 on the camera side. Ground potential is furnished at a terminal 17 on the camera side which is directly connectable to a terminal 21 on the microphone side. The positive and negative sides of battery 16 are directly connected to terminals 18 and 17 respectively.

When the camera is first put into operation, switches 15 and 15a are closed and the above-mentioned electromotor for driving the film is energized. Closing of switches 15a and 15 causes field-effect transistor 10 to be saturated, thereby substantially short-circuiting the input to amplifier 7 and substantially decreasing or completely eliminating the sound recorded by recording head 4. Only when capacitor 14 has charged sufficiently that field-effect transistor 10 is blocked, can the sound be recorded full strength on the sound track. At the end of a particular scene switches 15 and 15a are reopened and then closed again for the next subsequent scene.

While the invention has been illustrated and described as embodied in a field-effect transistor and an RC timing circuit as a damping circuit, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended:

1. In a motion picture camera having film, a sound track on said film, transport means for transporting said film along a predetermined path, said transport means requiring a determined start-up time for reaching a determined operating speed from a stopped condition, and transfer means for transferring audio signals furnished to said motion picture camera to said sound track: damping means connected to said transfer means for damping said audio signals during said determined start-up time, said damping means further comprises timing means for furnishing a timing signal varying as a predetermined function of time following said start-up of said transport means.

2. A motion picture camera as set forth in claim 1, wherein said damping means further comprises a semiconductor element having a control electrode connected to said timing means and an output circuit connected to said transfer means, the resistance of said output circuit varying as a function of said timing signal.

3. A motion picture camera as set forth in claim 2, wherein said motion picture camera further comprises a battery; wherein said semiconductor element is a field-effect transistor; and wherein said timing means comprise an RC timing circuit including at least one capacitor and one resistor, and switch means for connecting said RC timing circuit to said battery upon activation of said motion picture camera.

4. A motion picture camera as set forth in claim 3, wherein said transfer means include a recording head at a first predetermined location along said predetermined path of said film; wherein said motion picture camera further comprises an aperture at a second predetermined location along said predetermined path of said film, said second predetermined location preceding said first predetermined location by a predetermined distance in the direction of film transport; and wherein said RC timing circuit has a time constant substantially equal to the time required for a point on said film for travel from said first to said second predetermined location.

5. A motion picture camera as set forth in claim 4, wherein said motion picture camera further comprises a high-frequency oscillator; wherein said transfer means comprise an amplifier and means for connecting the output of said amplifier to the output of said high-frequency oscillator and to said recording head; and wherein said field-effect transistor is connected to the input of said amplifier.

6. A motion picture camera as set forth in claim 1, further comprising microphone means associated with said motion picture camera for transducing sound waves impinging thereon into corresponding electrical audio signals; and connecting means for connecting said microphone means to said motion picture camera.

7. A motion picture camera as set forth in claim 6, wherein said microphone means comprise a microphone and an amplifier connected to the output of said microphone; and wherein said transfer means comprise a resistor connected between the output of said amplifier of said microphone means and said field-effect transistor, said resistor having a resistance substantially exceeding the resistance of said field-effect transistor when in the conductive state.

* * * * *